US 8,910,890 B2
(12) United States Patent
Ambo et al.

(10) Patent No.: US 8,910,890 B2
(45) Date of Patent: Dec. 16, 2014

(54) SEEDING DEVICE

(75) Inventors: Kei Ambo, Wako (JP); Makoto Yanaka, Wako (JP); Yuji Ishitsuka, Wako (JP); Yuichi Fukuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 13/302,046

(22) Filed: Nov. 22, 2011

(65) Prior Publication Data

US 2012/0126032 A1 May 24, 2012

(30) Foreign Application Priority Data

Nov. 24, 2010 (JP) ................................. 2010-261070
Nov. 24, 2010 (JP) ................................. 2010-261071

(51) Int. Cl.
*B05B 1/26* (2006.01)
*G01M 9/06* (2006.01)
*B05B 7/04* (2006.01)
*B05B 7/06* (2006.01)
*B05B 15/04* (2006.01)

(52) U.S. Cl.
CPC .............. *G01M 9/067* (2013.01); *B05B 7/0408* (2013.01); *B05B 7/0475* (2013.01); *B05B 7/0483* (2013.01); *B05B 7/067* (2013.01); *B05B 7/068* (2013.01); *B05B 15/0406* (2013.01)
USPC ........... 239/518; 239/103; 239/120; 239/122; 239/370; 239/424; 239/433; 239/499; 239/421; 239/523; 239/524; 239/543; 261/78.2; 261/116; 73/861.05

(58) Field of Classification Search
USPC ......... 239/103, 104, 120, 121, 122, 338, 340, 239/370, 423, 424, 424.5, 433, 499, 500, 239/502, 503, 518, 521, 543, 544, 509, 510, 239/523, 524; 261/78.1, 78.2, 115, 116; 73/861.05, 861.07
See application file for complete search history.

(56) References Cited

U.S. PATENT DOCUMENTS 684,676 A * 10/1901 Comins ......................... 239/122
5,153,665 A * 10/1992 Weinstein ................... 73/861.05
(Continued)

FOREIGN PATENT DOCUMENTS

JP 56-90974 7/1981
JP 58-69722 5/1983
(Continued)

OTHER PUBLICATIONS

Japanese Office Action dated Jan. 15, 2014, 2 pages.

(Continued)

*Primary Examiner* — Steven J Ganey
(74) *Attorney, Agent, or Firm* — Rankin, Hill & Clark LLP

(57) ABSTRACT

Tracer particles together with air are jetted from a nozzle of a seeder into a hood, the air is guided by a collision surface of the hood, deflected to a downstream side in an airflow direction in a wind tunnel, and flows out into the wind tunnel through an opening of the hood. Tracer particles having a large diameter fly straightly without being drifted by the deflected air and collide with the collision surface and are trapped thereon and are prevented from being supplied into the wind tunnel. Tracer particles having a small diameter are drifted by the deflected air, thereby deflected, and supplied into the wind tunnel without collision with and adhesion to the collision surface.

19 Claims, 6 Drawing Sheets

(56) References Cited

U.S. PATENT DOCUMENTS

| | | | |
|---|---|---|---|
| 6,405,944 B1 * | 6/2002 | Benalikhoudja | 239/338 |
| 2006/0163380 A1 * | 7/2006 | Ahn | 239/340 |
| 2006/0283985 A1 * | 12/2006 | Ikeuchi et al. | 239/543 |

FOREIGN PATENT DOCUMENTS

| | | |
|---|---|---|
| JP | 63-103940 | 5/1988 |
| JP | 63-31715 | 8/1988 |
| JP | 02-233166 | 9/1990 |
| JP | 6-186130 | 7/1994 |
| JP | 2005-78980 | 3/2005 |
| JP | 2006-55714 | 3/2006 |

OTHER PUBLICATIONS

Japanese Office Action dated Jul. 24, 2013, 2 pages.

* cited by examiner

SEEDING DEVICE

CROSS-REFERENCE TO RELATED APPLICATIONS

The present invention claims priority under 35 USC §119 based on Japanese patent application Nos. 2010-261070 and 2010-261071 filed 24 Nov. 2010. The subject matters of these priority documents are incorporated by reference herein.

FIELD OF THE INVENTION

The present invention relates to a seeding device for supplying a wind tunnel with tracer particles jetted together with air from a nozzle of a seeder and a seeding device comprising a hood for guiding air and tracer particles jetted from a nozzle of a seeder to deflect a flow passage, the seeding device configured such that the deflected air and tracer particles are supplied into a wind tunnel through an opening of the hood.

DESCRIPTION OF THE RELATED ART

An atomizer configured as below to be used in a humidifier atomizing water and a combustor atomizing a fuel is known from Japanese Utility Model Publication No. 63-31715. The atomizer produces fine droplets by jetting a pressurized liquid outwardly in a radial direction from a nozzle, causing the liquid to collide perpendicularly with an inner peripheral surface of a cylindrical collision object disposed in such a manner as to surround the nozzle.

Meanwhile, particle image velocimetry (PIV) is known in a wind tunnel test. Specifically, tracer particles which are fine oil droplets having a diameter of approximately several μm are supplied into air from a seeding device. The tracer particles are irradiated with laser light, and an image of reflected light is captured with a camera. Thus, an airflow around an object is visualized.

When a wind tunnel test is conducted using such particle image velocimetry, tracer particles produced by the seeding device flow together with air, and adhere to a wall surface and a floor surface of a wind tunnel. This brings about problems of increased time and cost of cleaning work for removing the adhering tracer particles using a degreasing agent.

It is known that if tracer particles have a diameter of 4 μm or larger, the tracer particles are likely to adhere to a wall surface and a floor surface of a wind tunnel. Thus, presumably if the diameter of tracer particles can be reduced to be smaller than 4 μm, the amount of tracer particles to adhere is greatly reduced and the cleaning work can be simplified.

However, tracer particles produced by conventional seeding devices including the above-described one of Japanese Utility Model Publication No. 63-31715 have various diameters. It has been difficult to prevent generation of tracer particles having a diameter of 4 μm or larger.

Moreover, it is thought that by providing a hood for guiding air and tracer particles jetted from a nozzle of a seeder to deflect a flow passage thereof, tracer particles having a large diameter are trapped on an inner surface of the hood, while only tracer particles having a small diameter are supplied into a wind tunnel through an opening of the hood.

However, in such a configuration, oil droplets generated from the tracer particles adhering to the inner surface of the hood are pushed by air flowing inside the hood and thereby flow toward the opening. The oil droplets may scatter into the wind tunnel through the opening, causing stain in some cases.

SUMMARY OF THE INVENTION

The present invention has been made in view of the above-described circumstances. An object of the present invention is to prevent stain of a wind tunnel caused by tracer particles supplied from a seeding device.

In order to achieve the object, according to a first feature of the present invention, there is provided a seeding device for supplying a wind tunnel with tracer particles jetted together with air from a nozzle of a seeder, the seeding device comprising: a collision surface inclined with respect to a jetting direction of the tracer particles from the nozzle; and a hood which covers the nozzle and the collision surface on an upstream side in an airflow direction in the wind tunnel, and which has an opening formed therein on a downstream side in the airflow direction, wherein among the tracer particles jetted from the nozzle, tracer particles having a large diameter collide with the collision surface and are trapped thereon, and tracer particles having a small diameter are supplied into the wind tunnel through the opening of the hood.

According to the above feature, when tracer particles together with air are jetted from the nozzle of the seeder into the hood, the air is guided by the collision surface of the hood, deflected to the downstream side in the airflow direction in the wind tunnel, and flows out into the wind tunnel through the opening of the hood. In this event, since having a large inertia, tracer particles having a large diameter fly straightly without being drifted by the deflected air and collide with the collision surface and are trapped thereon. Thus, the tracer particles having a large diameter are prevented from being supplied into the wind tunnel. On the other hand, since having a small inertia, tracer particles having a small diameter are drifted by the deflected air, thereby deflected, and supplied into the wind tunnel without collision with and adhesion to the collision surface. As a result, it is possible to suppress supplying of the tracer particles having a large diameter into the wind tunnel to the minimum, and to prevent the tracer particles having a large diameter from causing stain by adhering to a wall surface and a floor surface of the wind tunnel.

According to a second feature of the present invention, in addition to the first feature, a flange is formed at the opening of the hood, the flange being folded inwardly at an obtuse angle.

According to the above feature, the flange folded inwardly at an obtuse angle is formed at the opening of the hood. Accordingly, an oil droplet generated from the tracer particles adhering to an inner surface of the hood is trapped at an inner side of the flange, and thereby it is possible to prevent the oil droplet from scattering into the wind tunnel through the opening.

According to a third feature of the present invention, there is provided a seeding device comprising a hood for guiding air and tracer particles jetted from a nozzle of a seeder to deflect a flow passage, the seeding device configured such that the deflected air and tracer particles are supplied into a wind tunnel through an opening of the hood, wherein a flange is formed at the opening of the hood, the flange being folded inwardly at an obtuse angle.

According to the above feature, when tracer particles together with air are jetted from the nozzle of the seeder into the hood, most of tracer particles having a large diameter are trapped on the inner surface of the hood. Meanwhile, most of tracer particles having a small diameter flow out into the wind tunnel through the opening of the hood. Accordingly, it is possible to suppress supplying of the tracer particles having a large diameter into the wind tunnel to the minimum, and to prevent the tracer particles having a large diameter from causing stain by adhering to a wall surface and a floor surface of the wind tunnel. An oil droplet generated from tracer particles adhering to the inner surface of the hood flows toward the opening by being pushed by the air flowing inside the hood. However, since the flange folded inwardly at an obtuse angle is formed at the opening of the hood, the oil droplet is trapped at an inner side of the flange, and thereby it is possible to prevent the oil droplet from scattering into the wind tunnel through the opening.

According to a fourth feature of the present invention, in addition to the third feature, the hood includes a collision surface inclined with respect to a jetting direction of the tracer particles from the nozzle, and among the tracer particles jetted from the nozzle, tracer particles having a large diameter collide with the collision surface and are trapped thereon, and tracer particles having a small diameter are supplied into the wind tunnel through the opening of the hood.

According to the above feature, the hood includes the collision surface inclined with respect to the jetting direction of tracer particles from the nozzle. Accordingly, among the tracer particles jetted from the nozzle, tracer particles having a large diameter collide with the collision surface and are trapped thereon, while tracer particles having a small diameter are supplied into the wind tunnel through the opening of the hood. Thus, tracer particles having a large diameter can be further effectively blocked from being supplied into the wind tunnel.

According to a fifth feature of the present invention, in addition to the first, second or fourth feature, the collision surface has an inclination angle of substantially 45°.

According to the above feature, the inclination angle of the collision surface is substantially 45°. This makes it possible to efficiently trap tracer particles having a large diameter.

According to a sixth feature of the present invention, in addition to the any one of the first to fourth features, a drain hole is formed in a lower portion of the hood, the drain hole draining an oil droplet of the trapped tracer particles.

According to the above feature, since the drain hole for draining an oil droplet of the trapped tracer particles is formed in the lower portion of the hood, it is possible not only to prevent the oil droplet from accumulating in the hood, but also to collect the oil droplet for recycle.

According to a seventh feature of the present invention, in addition to the any one of the first to fourth features, the opening of the hood is formed only at a position facing a downstream side of the collision surface.

According to the above feature, the opening of the hood is formed only at the position facing the downstream side of the collision surface. Accordingly, among the tracer particles jetted from the nozzle, tracer particles having a large diameter which do not collide with the collision surface and are not trapped thereon, can be blocked from being supplied directly into the wind tunnel through the opening of the hood.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 1 is a perspective view of a seeding device;
FIG. 2 is a sectional view taken along a line 2-2 in FIG. 1;
FIG. 3 is a sectional view taken along a line 3-3 in FIG. 2;
FIG. 4 is a view explaining operation of a collision surface.

DESCRIPTION OF THE PREFERRED EMBODIMENTS

A first embodiment of the present invention will be described below based on FIGS. 1 to 5C.

Figure 1:
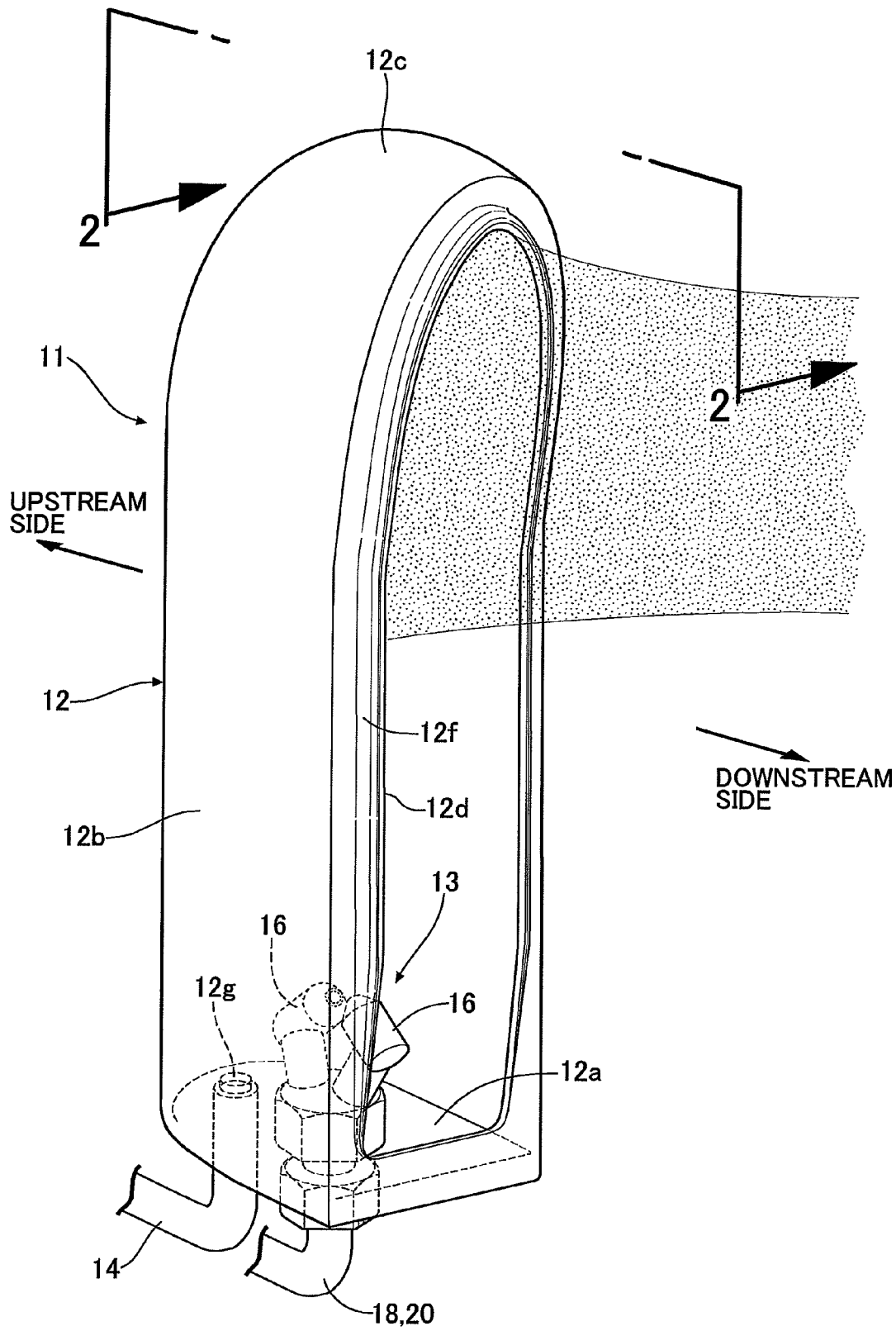
FIGS. 1 to 5C show a first embodiment of the present invention.
Figure 2:
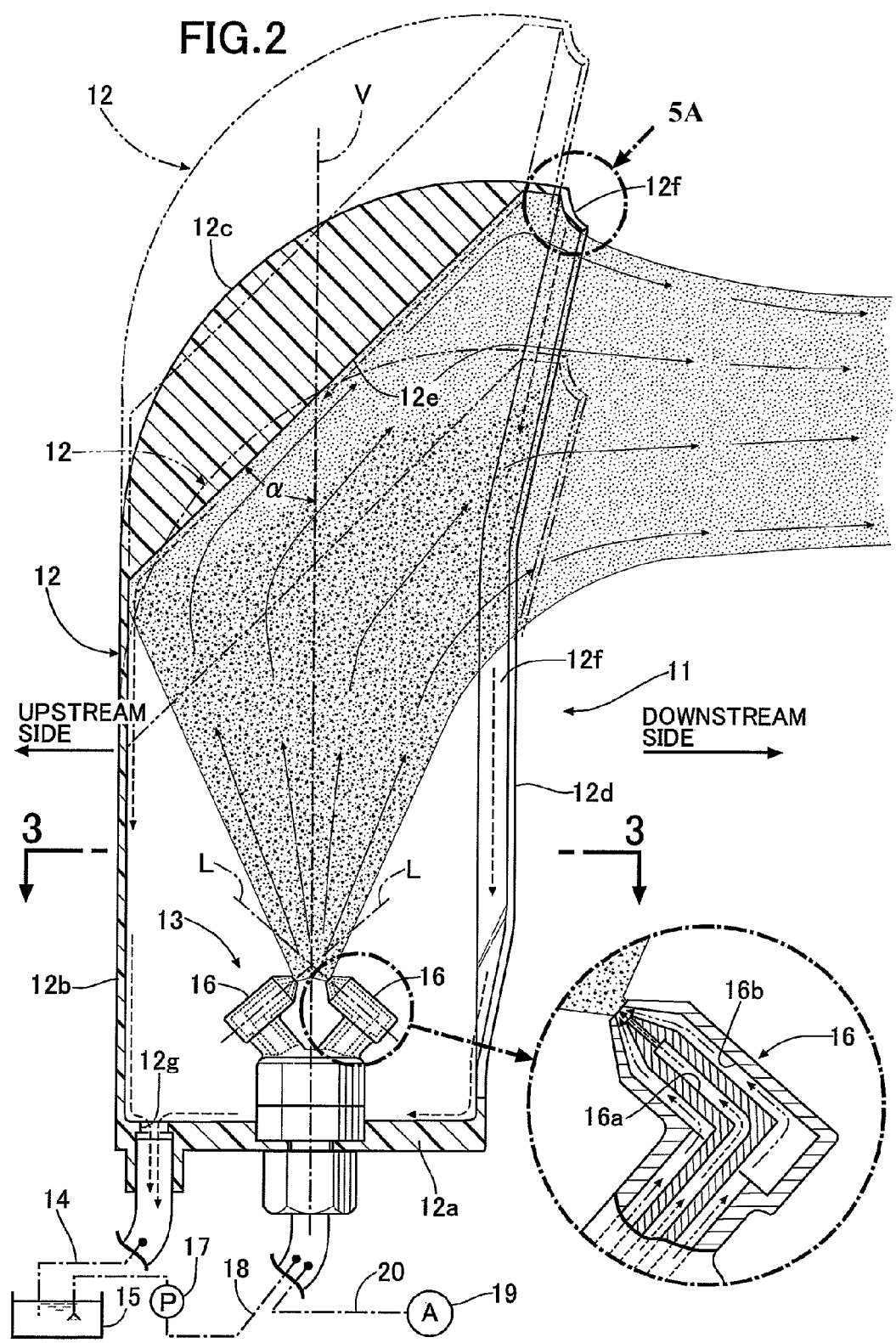
Figure 3:
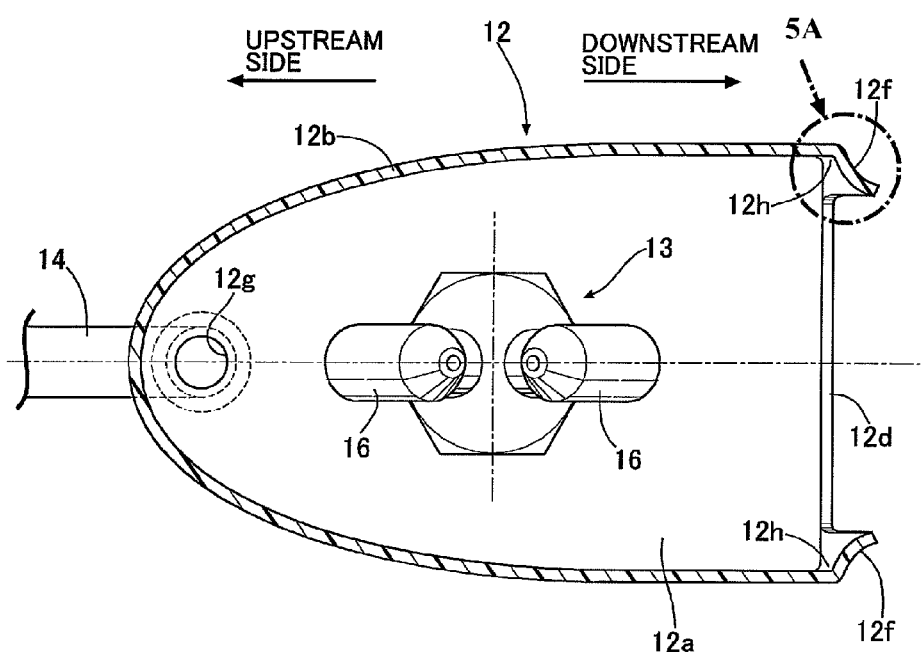

As shown in FIGS. 1 to 3, a seeding device 11 includes a hood 12 integrally made of a synthetic resin, and a seeder 13 which is provided on a bottom wall 12a of the hood 12, and which jets tracer particles together with air. The seeding device 11 supplies a wind tunnel with atomized tracer particles of DOS (lubricant type oil) and a mixture of water and glycerin (hereinafter, referred to as an oil).

The hood 12 has a hood body portion 12b which stands upright from the flat bottom wall 12a in a vertical direction. An upper portion of the hood body portion 12b is covered with a ceiling wall 12c. The hood body portion 12b has a longitudinal cross section in a U shape so as to suppress air turbulence in the wind tunnel to the minimum. Specifically, the hood body portion 12b is closed on an upstream side in an airflow direction in the wind tunnel, and has an opening 12d formed therein on a downstream side in the airflow direction. In the embodiment, as the longitudinal cross-sectional shape of the hood body portion 12b, a front half portion of symmetric airfoil type (NACA0025) is employed.

The ceiling wall 12c of the hood 12 is smoothly curved obliquely upward from a front edge of the hood body portion 12b to the downstream side. A flat collision surface 12e is formed on an inner surface of the ceiling wall 12c. The collision surface 12e inclines at an inclination angle $\alpha=45°$ in such a manner that an upstream side thereof is low while a downstream side thereof is high in a jetting direction V (vertical direction) of the tracer particles from the seeder 13.

Figure 5A:
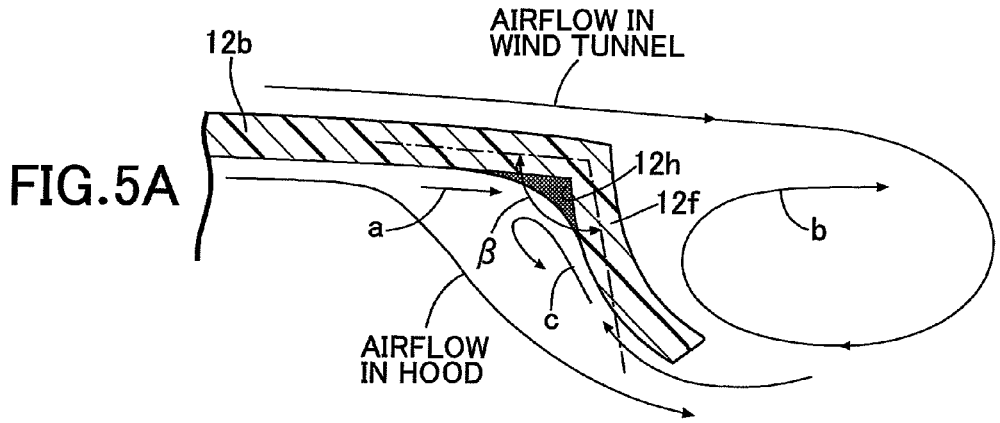
FIG. 5A is an enlarged view of a part indicated by an arrow 5A in FIGS. 2 and 3, and FIGS. 5B and 5C are reference samples.

Along a peripheral edge of the opening 12d of the hood 12, a flange 12f is formed by inwardly folding the hood body portion 12b and the ceiling wall 12c. As shown in FIG. 5A, the flange 12f of the hood 12 forms an obtuse angle $\beta$ with respect to downstream ends of the hood body portion 12b and the ceiling wall 12c and is curved convex inwardly. Note that the flange is folded at a right angle with respect to the hood body portion 12b only at a portion corresponding to a lower end of the opening 12d, that is, the portion facing the bottom wall 12a.

Moreover, a drain hole 12g is formed in an upstream side portion of the bottom wall 12a of the hood 12. The drain hole 12g is connected to a tank 15 through an oil drain hose 14.

The seeder 13 provided on a central portion of the bottom wall 12a of the hood 12 includes two nozzles 16, 16 having axes L, L crossing each other. Each of the nozzles 16 includes an oil passage 16a formed in a central portion thereof and an air passage 16b formed in such a manner as to surround the oil passage 16a. An oil in the tank 15 is supplied to the oil passage 16a through an oil pump 17 and an oil supply hose 18, while air is supplied to the air passage 16b from an air compressor 19 through an air supply hose 20.

Next, operations of the embodiment of the present invention having the above-described configuration will be described.

An oil pumped by the oil pump 17 from the tank 15 is supplied to the oil passage 16a of each nozzle 16 of the seeder 13 through the oil supply hose 18. Simultaneously with this, air compressed by the air compressor 19 is supplied to the air passage 16b of each nozzle 16 of the seeder 13. The oil jetted from a tip end of the oil passage 16a is atomized by the air jetted from a tip end of the air passage 16b, and sprayed as tracer particles. In this event, since the two nozzles 16, 16 are arranged in such a manner that the axes L, L cross each other, tracer particles sprayed from the two nozzles 16, 16 collide with each other, and are turned to tracer particles having a further smaller diameter and jetted upward in the jetting direction V. In this manner, the tracer particles jetted from the seeder 13 include those having a large diameter and those having a small diameter.

Figure 4:
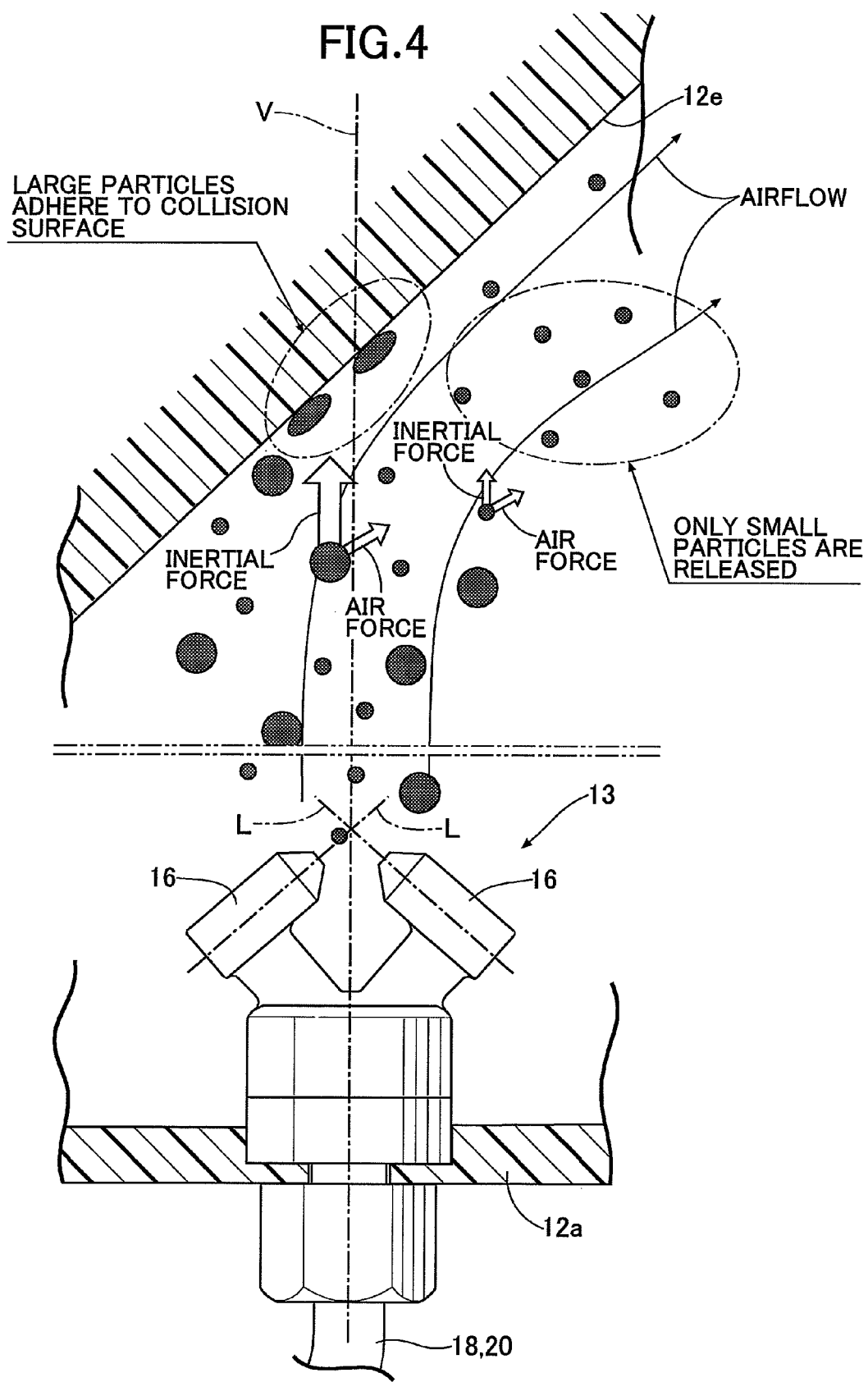

As shown in FIG. 4, the air jetted upward from the seeder 13 is guided to the collision surface 12e of the hood 12 which blocks a portion above the seeder 13, deflected at 90° to the downstream side in the airflow direction in the wind tunnel, and flows out into the wind tunnel through the opening 12d of the hood 12. In this event, the tracer particles mixed with the air jetted upward from the seeder 13 are also deflected to the downstream side together with the air. Nevertheless, tracer particles having a large diameter are hard to deflect and thus collide with the collision surface 12e. Meanwhile, tracer particles having a small diameter are easy to deflect and thus supplied into the wind tunnel through the opening 12d without colliding with the collision surface 12e.

The reason is as follows. The inertial force of tracer particles is proportional to the mass, and the mass is proportional to the cube of the diameter. Meanwhile, the air force exerted on the tracer particles by air is proportional to the surface area, and the surface area is proportional to the square of the diameter. Specifically, if the diameter of tracer particles for example doubles, the inertial force thereof is increased by 8 times, while the air force exerted by air is increased only by 4 times. Thus, the ability of the tracer particles to fly straightly is increased, making it hard to deflect the tracer particles.

In this manner, most of the tracer particles having a diameter of 4 μm or larger collide with the collision surface 12e. The tracer particles having a diameter of smaller than 4 μm and an extremely small portion of the tracer particles having a diameter of 4 μm or larger are supplied together with the deflect air into the airflow in the wind tunnel through the opening 12d of the hood 12. Hence, most of the tracer particles included in the airflow in the wind tunnel have a diameter of smaller than 4 μm. Thus, such tracer particles hardly adhere to a wall surface and a floor surface of the wind tunnel. Further, if adhered, the amount is small, and time and labor required for the cleaning work can be greatly saved, contributing to cost reduction.

When colliding with the collision surface 12e of the hood 12, the tracer particles having a diameter of 4 μm or larger adhere to the collision surface 12e and grow to large oil droplets. The oil droplets flow down to the bottom wall 12a along an inner surface of the hood body portion 12b, and are collected into the tank 15 through the oil drain hose 14 from the drain hole 12g provided in the bottom wall 12a for recycle.

As shown in FIG. 5A, some of the oil droplets adhering to the inner surface of the hood body portion 12b are drifted to the downstream side by the airflow deflected inside the hood body portion 12b, and trapped at a corner portion 12h sandwiched between the hood body portion 12b and the flange 12f. Although the oil droplets trapped at the corner portion 12h may be pushed out toward an end edge of the flange 12f by an airflow (see an arrow a) flowing along the inner surface of the hood body portion 12b, this is suppressed as follows. Specifically, since the flange 12f forms the obtuse angle β with respect to the hood body portion 12b and has an outer surface (surface facing the airflow in the wind tunnel) curved concave, part of a vortex (see an arrow b) generated on the downstream side of the hood 12 flows along an inner surface of the flange 12f (see an arrow c), thus suppressing pushing out of the oil droplets trapped at the corner portion 12h toward the end edge of the flange 12f. As a result, the oil droplets trapped at the corner portion 12h flow down along the flange 12f to the bottom wall 12a and are drained through the drain hole 12g without scattering into the wind tunnel.

Figure 5B:
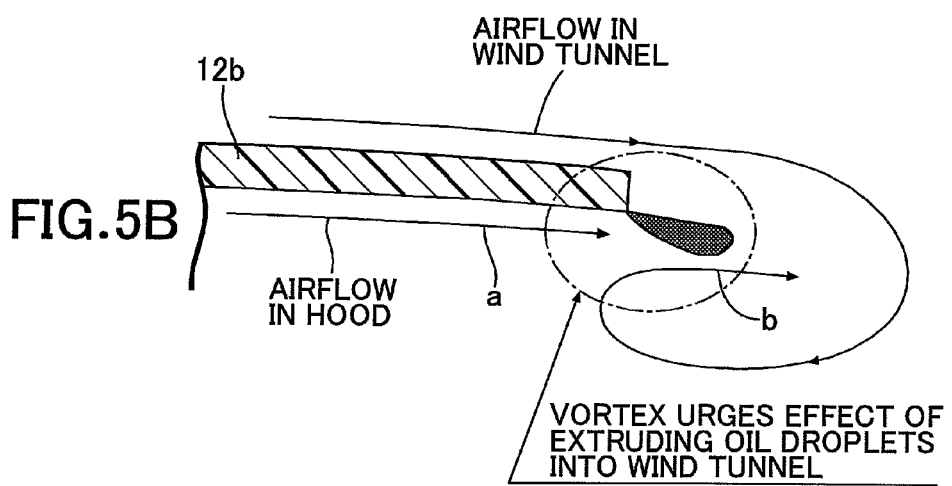

FIG. 5B illustrates, as a reference sample, a case where the hood 12 does not includes the flange 12f. The oil droplets pushed by the airflow (see an arrow a) flowing along the inner surface of the hood body portion 12b are extruded to the downstream side by the vortex (see an arrow b) generated on the downstream side of the hood 12, and scatter into the wind tunnel.

Figure 5C:
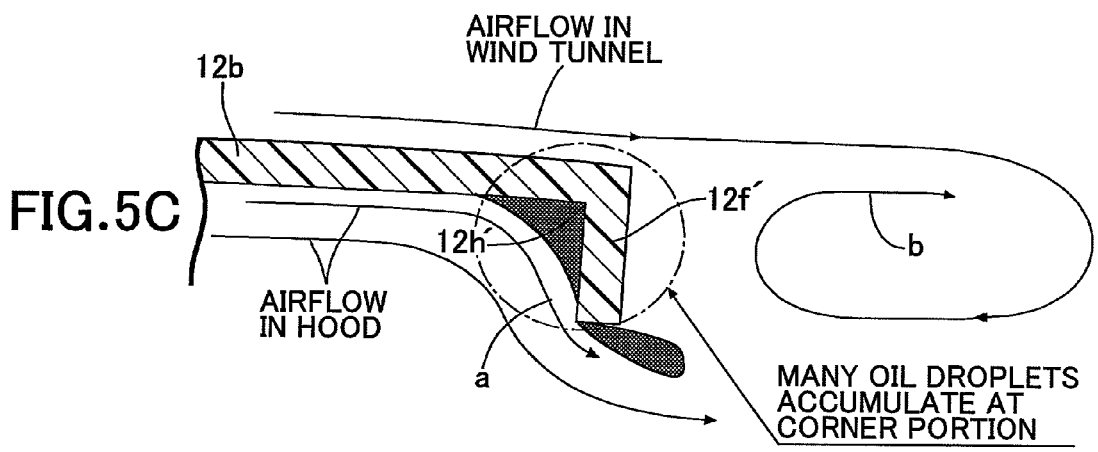

Meanwhile, FIG. 5C illustrates, as a reference sample, a case where a flange 12f' of the hood 12 is folded inwardly from the hood body portion 12b at a right angle. In this case, not only are a large amount of oil droplets trapped at a corner portion 12h' sandwiched between the hood body portion 12b and the flange 12f', but also the vortex (see an arrow b) generated on the downstream side of the hood 12 does not influence the trapped oil droplets. Accordingly, the oil droplets are pushed by the airflow (see an arrow a) flowing along the inner surface of the hood body portion 12b and scatter into the wind tunnel.

As shown by the dashed line in FIG. 2, the height (distance from the seeder 13 to the collision surface 12e) of the hood 12 is set to be an appropriate height in accordance with a jetting speed of air and tracer particles from the nozzles 16, 16 of the seeder 13.

Specifically, suppose a case where the jetting speed of air and tracer particles is high. In this case, if the height of the hood 12 is too low, not only may even tracer particles having a small diameter collide with the collision surface 12e and be trapped thereon, but also oil droplets of large-diameter tracer particles colliding with the collision surface 12e and trapped thereon may be blown off by a strong airflow and supplied into the wind tunnel.

Meanwhile, suppose a case where the jetting speed of air and tracer particles is low. In this case, if the height of the hood 12 is too great, the inertial force of the tracer particles is weakened by gravity. Accordingly, even tracer particles having a large diameter cannot reach the collision surface 12e and may be deflected by the airflow and supplied into the wind tunnel.

As described above, according to this embodiment, among tracer particles having various diameters jetted from the seeder 13, tracer particles having a large diameter are trapped and collected on the hood 12, and only tracer particles having a small diameter can be selectively supplied into the wind tunnel. This makes it possible to suppress adhering of the tracer particles having a large diameter to the wall surface and the floor surface of the wind tunnel to the minimum.

Figure 6:
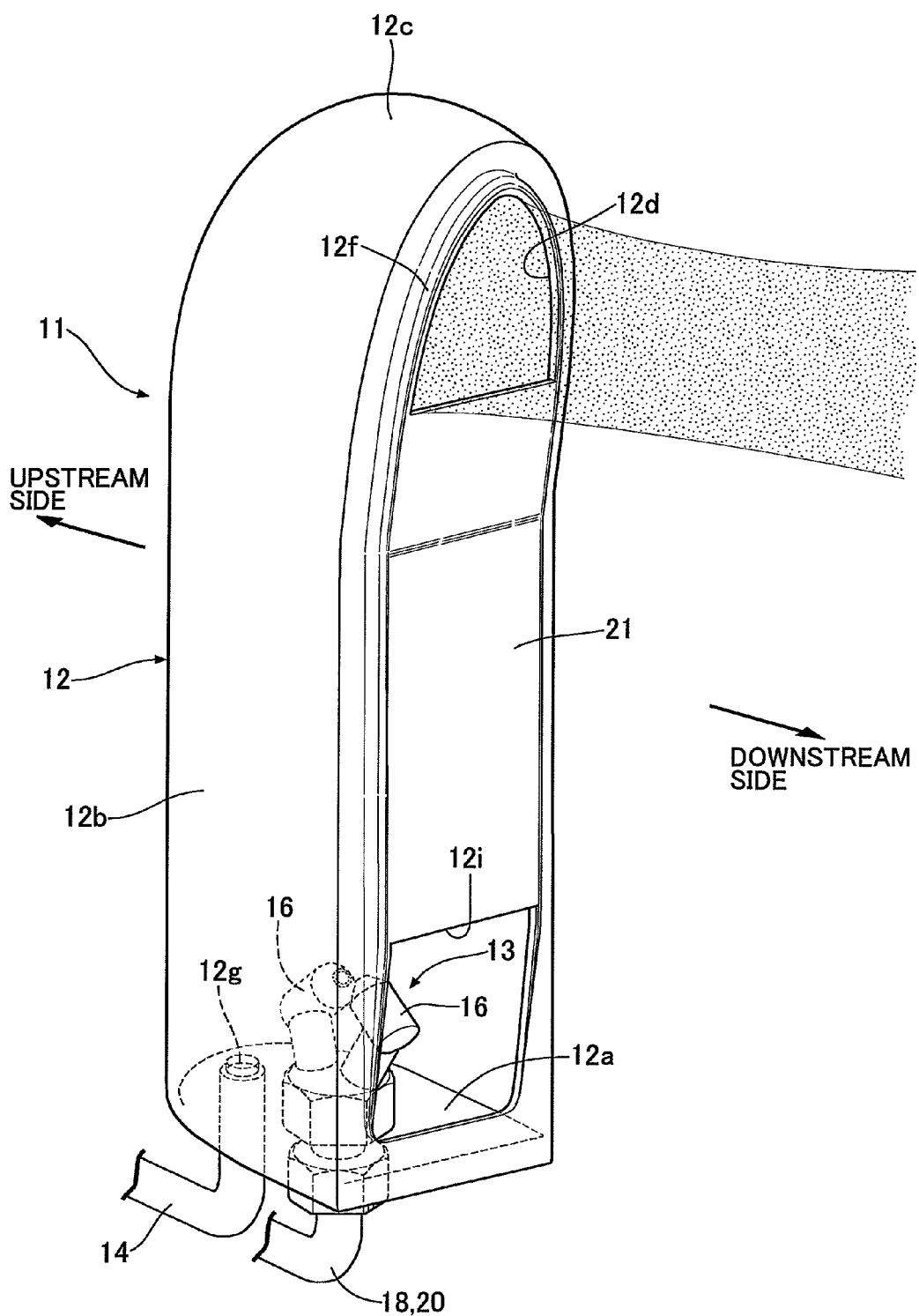
FIG. 6 is a perspective view of a seeding device according to a second embodiment.

Next, a second embodiment of the present invention will be described based on FIG. 6.

The hood 12 in the first embodiment has the opening 12d formed across the entire surface on the downstream side thereof. Meanwhile, in the second embodiment, a hood 12 has an opening 12d formed only in an upper portion (ceiling wall 12c side) thereof and has the other portion covered with a shielding plate 21.

The reason is that if the opening 12d is formed across the entire surface on the downstream side of the hood 12, this increases a probability that, among tracer particles jetted from the nozzles 16, 16 of the seeder 13, those jetted to the downstream side do not collide with the inner surface of the hood body portion 12b and the collision surface 12e, and thereby the tracer particles having a large diameter pass through the opening 12d and are supplied directly into the wind tunnel. In this embodiment, by providing the shielding plate 21, tracer particles jetted to the downstream side from nozzles 16, 16 of a seeder 13 collide with the shielding plate 21, and thereby tracer particles having a large diameter are trapped on the shielding plate 21 and can be blocked from being supplied into the wind tunnel.

Note that, in the second embodiment, an opening 12*i* is formed between a lower edge of the shielding plate 21 and a bottom wall 12*a*. The opening 12*i* is to facilitate cleaning of an oil droplet adhering to the bottom wall 12*a* and maintenance of the seeder 13, and can be omitted. When a flange folded toward the inner portion of the hood 12 is formed at an upper edge of the shielding plate 21 facing the opening 12*d* of the hood 12, this makes it possible to prevent an oil droplet generated from tracer particles colliding with an inner surface of the shielding plate 21 from flowing upward along the inner surface of the shielding plate 21 by being pushed by air, and from scattering into the wind tunnel through the opening 12*d*.

Hereinabove, embodiments of the present invention have been described. However, various design modifications are possible within the scope not departing from the gist of the present invention.

For example, in the embodiments, the inclination angle α of the collision surface 12*e* is set at 45°, but the angle is not limited to 45°.

Moreover, the seeder 13 exemplified in the embodiments has the two nozzles 16, 16 having the axes L, L crossing each other. Nonetheless, it is possible to employ a seeder 13 having any other structure.

What is claimed is:

1. A seeding device for supplying a wind tunnel with tracer particles jetted together with air from a nozzle of a seeder, the seeding device comprising:
 a collision surface inclined with respect to a jetting direction of the tracer particles from the nozzle; and
 a hood which covers the nozzle and the collision surface on an upstream side in an airflow direction in the wind tunnel, and which has an opening formed therein on a downstream side in the airflow direction, wherein
  among the tracer particles jetted from the nozzle,
   tracer particles having a large diameter collide with the collision surface and are trapped thereon, and
   tracer particles having a small diameter are supplied into the wind tunnel through the opening of the hood,
  wherein a flange is formed to extend over a substantially entire portion of the opening of the hood where the tracer particles supplied into the wind tunnel pass, the flange being folded inwardly at an obtuse angle.

2. The seeding device according to claim 1, wherein the collision surface has an inclination angle of substantially 45°.

3. The seeding device according to claim 1, further comprising a drain hole formed in a lower portion of the hood, the drain hole draining an oil droplet of the trapped tracer particles.

4. The seeding device according to claim 1, wherein the opening of the hood is formed only at a position that is opposed to and faces a downstream side of the collision surface.

5. The seeding device according to claim 4, wherein at least a portion of the opening and the collision surface are disposed at a same height from the nozzle of the seeder in the jetting direction.

6. The seeding device according to claim 1, wherein the opening extends from an upper end portion of the hood to a lower end potion of the hood and the flange is formed along an upper end to a lower end of the opening and wherein a drain hole is formed in the lower end portion of the hood for draining an oil droplet of the tracer particles trapped on the collision surface.

7. The seeding device according to claim 1, wherein the flange has an outer surface, exposed to an airflow in the wind tunnel, formed to be curved concave and thus an inner surface of the flange is curved convex toward an inside of the hood.

8. The seeding device according to claim 1, wherein the hood comprises a body portion having the opening defined through a portion thereof, and the flange extends from the body portion and defines at least a portion of a peripheral edge of the opening of the hood, the flange extending from the body portion and being folded inwardly at the obtuse angle toward the opening of the hood relative to an inner surface of the body portion from which the flange extends.

9. The seeding device according to claim 1, wherein the collision surface is spaced at a distance from the nozzle of the seeder in the jetting direction such that, among the tracer particles jetted from the nozzle, tracer particles having a diameter larger than a predetermined diameter collide with the collision surface and are trapped thereon, and tracer particles having a diameter smaller than the predetermined diameter do not collide with the collision surface and are supplied into the wind tunnel through the opening of the hood.

10. The seeding device according to claim 1, further comprising the nozzle jetting tracer particles with air at a predetermined jetting speed, wherein the collision surface is spaced at a distance from the nozzle in the jetting direction such that, for the predetermined jetting speed, among the tracer particles jetted from the nozzle, tracer particles having a diameter larger than a predetermined diameter collide with the collision surface and are trapped thereon, and tracer particles having a diameter smaller than the predetermined diameter do not collide with the collision surface and are supplied into the wind tunnel through the opening of the hood.

11. The seeding device according to claim 1, wherein among the tracer particles jetted from the nozzle, the tracer particles having the small diameter are supplied into the wind tunnel through the opening of the hood without colliding with the collision surface.

12. A seeding device comprising a hood for guiding air and tracer particles jetted from a nozzle of a seeder to deflect a flow passage, the seeding device configured such that the deflected air and tracer particles are supplied into a wind tunnel through an opening of the hood, wherein
 a flange is formed to extend over a substantially entire portion of the opening of the hood where the deflected air and the tracer particles supplied into the wind tunnel pass, the flange being folded inwardly at an obtuse angle.

13. The seeding device according to claim 12, wherein the hood includes a collision surface inclined with respect to a jetting direction of the tracer particles from the nozzle, and
 among the tracer particles jetted from the nozzle,
  tracer particles having a large diameter collide with the collision surface and are trapped thereon, and
  tracer particles having a small diameter are supplied into the wind tunnel through the opening of the hood.

14. The seeding device according to claim 13, wherein the collision surface has an inclination angle of substantially 45°.

15. The seeding device according to claim 13, further comprising a drain hole formed in a lower portion of the hood, the drain hole draining an oil droplet of the trapped tracer particles.

16. The seeding device according to claim 13, wherein the opening of the hood is formed only at a position that is opposed to and faces a downstream side of the collision surface.

17. The seeding device according to claim 12, further comprising a drain hole formed in a lower portion of the hood, the drain hole draining an oil droplet of the trapped tracer particles.

18. The seeding device according to claim 12, wherein the hood is provided in the wind tunnel and the flange has an outer surface, exposed to an airflow in the wind tunnel, formed to be curved concave and an inner surface of the flange is curved convex toward an inside of the hood, so that part of a vortex generated on a downstream side of the outer surface of the flange in the direction of the airflow in the wind tunnel flows along the inner surface of the flange in a direction reverse to a direction of airflow inside the hood.

19. The seeding device according to claim 12, wherein the hood comprises a body portion having the opening defined through a portion thereof, and the flange extends from the body portion and defines at least a portion of a peripheral edge of the opening of the hood, the flange extending from the body portion and being folded inwardly at the obtuse angle toward the opening of the hood relative to an inner surface of the body portion from which the flange extends.

* * * * *